(12) United States Patent
Henry

(10) Patent No.: US 12,502,014 B1
(45) Date of Patent: Dec. 23, 2025

(54) RETAIL TOOL HOLDER

(71) Applicant: SAPP Australia Pty Ltd, North Ryde (AU)

(72) Inventor: Simon Henry, North Ryde (AU)

(73) Assignee: SAPP Australia Pty Ltd, North Ryde (AU)

( * ) Notice: Subject to any disclaimer, the term of this patent is extended or adjusted under 35 U.S.C. 154(b) by 0 days.

(21) Appl. No.: 18/792,653

(22) Filed: Aug. 2, 2024

(30) Foreign Application Priority Data

Jun. 21, 2024 (AU) ................................ 2024204274

(51) Int. Cl.
*A47F 5/02* (2006.01)
(52) U.S. Cl.
CPC ..................................... *A47F 5/02* (2013.01)
(58) Field of Classification Search
CPC .. H01M 50/204; H01M 50/244; B25H 3/006; B25H 3/00; F16M 11/04; F16M 11/041; F16M 13/00; F16M 13/02; F16M 13/022; A47F 5/02
See application file for complete search history.

(56) References Cited

U.S. PATENT DOCUMENTS

| | | | | |
|---|---|---|---|---|
| 5,187,744 | A * | 2/1993 | Richter | F16M 11/041 379/426 |
| 7,320,450 | B2 * | 1/2008 | Carnevali | F16M 11/14 248/180.1 |
| 8,020,816 | B2 * | 9/2011 | Laitila | F16M 11/041 248/125.7 |
| 9,568,148 | B2 * | 2/2017 | Carnevali | F16M 13/00 |
| 9,695,849 | B2 * | 7/2017 | Zhou | F16M 11/041 |
| 10,736,403 | B2 * | 8/2020 | Yamaoka | B25F 5/02 |
| 11,465,272 | B1 * | 10/2022 | Date | B25H 3/04 |
| 11,495,929 | B1 * | 11/2022 | Murray | H01M 50/247 |
| 11,679,488 | B2 * | 6/2023 | Huang | H01M 50/204 320/112 |
| 11,826,896 | B2 * | 11/2023 | Keller | B25H 3/04 |
| 12,051,819 | B2 * | 7/2024 | Adams | H01M 50/244 |
| 2007/0228093 | A1 * | 10/2007 | Durham | B25H 3/006 224/248 |
| 2014/0097217 | A1 * | 4/2014 | Walsh | A45F 5/02 224/268 |
| 2014/0291362 | A1 * | 10/2014 | Victor | B25H 3/006 224/222 |
| 2016/0322844 | A1 * | 11/2016 | Pickens | H01M 50/296 |
| 2021/0078158 | A1 * | 3/2021 | Wages | F16M 13/02 |
| 2024/0146082 | A1 * | 5/2024 | Downes | H02J 7/0045 |

* cited by examiner

*Primary Examiner* — Patrick D Hawn
(74) *Attorney, Agent, or Firm* — The Webb Law Firm

(57) ABSTRACT

A tool stand for the retail display of battery-operated tools is disclosed. The tool stand includes a base for connection to display cabinetry, a post extending from the base and a platform connected to the post remote from the base. The platform is configured for connection to a tool by including a tool connection assembly that is shaped in the form of a battery connection of a battery suitable for connection to the tool to be displayed.

17 Claims, 4 Drawing Sheets

RETAIL TOOL HOLDER

CROSS-REFERENCE TO RELATED APPLICATION

This application claims priority to Australian Patent Application No. 2024204274 filed Jun. 21, 2024, the disclosure of which is hereby incorporated by reference in its entirety.

BACKGROUND OF THE INVENTION

Field of the Invention

The present invention relates to a tool holder for displaying a tool in a retail setting. The present invention has been developed principally in relation to the display of handheld, battery operated electrical tools, such as saws and drills, and it will be convenient to describe the invention in relation to that use. However, it should be appreciated that the invention is not restricted to that use and accordingly, the present invention could be used for the display of other tools or products.

Description of Related Art

The discussion of the background to the invention that follows is intended to facilitate an understanding of the invention. However, it should be appreciated that the discussion is not an acknowledgement or admission that any aspect of the discussion was part of the common general knowledge as at the priority date of the application.

In retail outlets such as hardware stores, sample handheld, battery operated electrical tools are displayed so that customers can see and feel the tools for purchasing selection. The tools that are displayed are not for sale, but rather, once a customer has made their selection, a new and packaged tool can be retrieved from elsewhere in the retail store for the customer to take to the checkout for payment. The customer thus purchases a new tool that has not been previously displayed or handled by other customers. Also, the tools that have been displayed remain on display for consideration by subsequent customers.

Despite the sample tools being on display, they are in fact real tools and are susceptible to theft. To discourage theft, the sample tools can be secured to the display and for example, security tethers or brackets have been used in the past to connect a sample tool to the display cabinetry. Beneficially, these tethers or brackets allow a sample tool to be lifted and manipulated for consideration by a customer. The tethers or brackets also have some effect on reducing theft, because a thief needs to take time to remove the tether or bracket for theft and this is often apparent to staff or other customers in the vicinity of the tool display. However, the tethers or brackets have not been successful in eliminating theft completely, and they also introduce limitations in the way a potential customer can interact with the tool. The tethers or brackets also allow the customer to return sample tools to the display cabinetry not in the original and optimum position for display and so staff are constantly required to monitor the tool display and to reposition sample tools within the display. The tethers or brackets are also required to be fitted to the sample tool and the display cabinetry which adds time and effort to the installation of the tool display.

In other arrangements, sample tools are displayed by attachment to tool stands. A tool stand includes a post that is fixed to the display cabinetry at one end, usually by screws or bolts and a sample tool can be fixed to the opposite end for display, again, usually by screws or bolts. The tool stand is often installed to be upstanding from a flat or horizontal racking or railing surface. Because the tool stand is fixed to the display cabinetry securely and the sample tool is fixed to the display cabinetry securely, the use of tool stands can make the tool display generally secure against theft of sample tools. However, like the security tethers or brackets, interaction with the sample tool can be made difficult using tool stands because of the fixing of the sample tools to the tool stand. Tool stands can include some flexibility for tool orientation, and for example, existing tool stands can include a platform to which the sample tool is connected that can rotate, usually about a horizontal axis. This gives the customer some ability to shift or rotate the tool.

Because of the continuing threat of tool theft, for battery operated tools, the display tools are often displayed without the battery attached, so that it is the tool "skin" that is displayed and so that if the sample tools are stolen, only the skin is stolen and not the battery. Advantageously, this minimises the loss value when only a tool skin is stolen.

In tool displays for battery operated electrical tools using tool stands, attachment of the tool skin (without the battery) to the tool stand platform requires the platform to be customised to each different tool. For example, the platform will attach to a drill in a different way or at a different position as compared to where the platform would attach to a circular saw or a grinder. Accordingly, the stand platform needs to be matched to the type of tool which is to be displayed and given that there are a large number of tools that can be displayed in this manner, there is the requirement for a large number of different platforms that mate or connect with the different tools. This means that sample tools can only be displayed on tool stands that have an appropriate platform already connected, or installation staff need to replace the existing platform with a different platform. Where a tool display is to be reconfigured, changing the location of the tools requires the platforms attached to the tool stands need to be replaced or reconfigured to suit the new sample tool to be attached. This of course takes time and effort and means that reconfiguration of tool displays requires a significant effort.

It is an aim of the present invention to provide an alternative form of tool stand which provides greater flexibility in the connection of sample tools to the stand as compared to existing prior art stands.

SUMMARY OF THE INVENTION

According to one form of the present invention, there is provided a tool stand for the retail display of battery-operated tools, the tool stand comprising:
 a base for connection to display cabinetry,
 a post extending from the base,
 a platform connected to the post remote from the base, the platform being configured for connection to a tool by including a tool connection assembly that is shaped in the form of a battery connection of a battery suitable for connection to the tool to be displayed.

A tool stand according to the present invention can advantageously facilitate connection to the tool stand of a suite or family of tools that use the same battery or battery style. That is, even though battery operated tools in a specific suite or family of tools can use batteries of different capacity, the connection part of the batteries of each manufacturer generally is the same regardless of the power output.

Moreover, tool manufacturers tend to adopt one particular proprietary form of battery connection that is consistent throughout the tools the particular manufacturer produces. For example, the tool manufacturer Ryobi, uses one particular form of battery connection for one of its suite or family of battery powered tools, while the tool manufacturer AEG also uses one particular form of battery connection, but that connection is different to the form of connection that Ryobi uses. This means that batteries suitable for Ryobi tools are unsuitable for connection to AEG tools and vice versa. However, where a retail display is to display the suite or family of tools of a particular manufacturer, one tool stand is suitable for connection to all of the tools or the suite or family that have the same battery connection. This could comprise a suite or family of 10 to 30 tools.

Thus, a tool stand according to an embodiment of the present invention will connect to each of a drill, a circular saw or a grinder for example of one manufacturer, if each of those tools uses the same battery connection. The tools may use different capacity batteries, but as long as the battery connection of the batteries is the same, then the tool stand that has a tool connection assembly that is shaped in the form of the appropriate battery connection, will be able to connect to any one of the drill, circular saw or grinder. Different capacity batteries typically only differ in the bulk or depth/length of the battery and not in the actual connection to the tool skin. With the tool stand of the present invention, it will not be necessary, as currently is the case with existing tool stands, to replace the platform to suit each individual tool.

Advantageously, this means that a number of tool stands can be connected to display cabinetry for display of the suite or family of tools of a particular manufacturer, without having to select tool stands which fit a particular tool of the suite or family of tools. The tool stands might have to be spaced apart different amounts depending on the shape and bulk of the tools, but otherwise, multiple tool stands having the same tool connection assembly can be installed for display of the full suite or family of tools. This enables tools to be easily changed from one position amongst the tool stands to another position to create the preferred display. Moreover, once a display has been created, changes to that display can be easily made as desired.

The present invention can also facilitate quick and easy connection and/or disconnection of a tool from the tool stand, because the tool connection assembly of the platform can be configured to connect to the tool and to disconnect from the tool in the same way a battery connects to a tool and is disconnectable from a tool. This means that in some forms of the invention, the connection can be a snap connection whereby the tool snaps into connection with the platform in the same way that a tool skin snaps into connection with a battery. In some arrangements, the snap connection of a battery to a tool skin can be released by finger pressure and in some forms of the invention, the platform can include two connectors that are releaseable by finger pressure.

By having the tool connection assembly shaped in the form of a battery connection, the present invention also improves the experience of the customer in handling the sample or display tool, because the customer can hold the tool as though a battery is connected and the customer can thus feel what the tool will actually feel like in use. Existing tool stands do not provide this benefit.

While the present invention can facilitate quick and easy connection and/or disconnection of a tool from the tool stand, it can also facilitate secure connection of a tool to the tool stand. In some forms of the invention, the tool skin can be connected by screw connection to the platform once the tool skin has connected to the tool connection assembly of the platform. In other forms of the invention, a screw can be inserted through or to interact with snap connection components so that the snap connection cannot be activated to release the tool skin without removing the screw. In this form of the invention, the tool skin can be connected to the platform through the snap connection and then the screw can be inserted into or to interact with the snap connection to disable the snap connection. This discourages theft as theft requires the screw to be removed before the snap connection can be disabled to disconnect the tool skin from the platform. The screw connection can include the use of a security screw with a security head that uses a special tool to install and remove the security screw, thereby increasing the difficulty for a thief to opportunistically disconnect the tool skin from the platform. Alternatively, other arrangements can be used to disable the snap connection so that the tool skin cannot be released from the tool stand.

The platform can be connected to the post in any suitable manner. In some forms of the invention, the platform can rotate or pivot relative to the post so as to allow optimum positioning of the platform for connection to a tool and/or to provide display options that allow tools to be displayed in different orientations. The platform may be fixable in a particular orientation so that once the orientation is set it remains in that orientation.

In some forms of the invention, the platform attaches to the post so that it can rotate through a single plane and be fixed in a selected position within the single plane. In this form of the invention, male and female plate connectors extending from each of the platform and the post can connect together such as by a single bolt connection to allow rotation in the plane of the plate connectors. For example, a pair of spaced apart plates can extend from one of the platform and the post and a single plate can extend from the other of the platform and the post, with the spacing between the spaced apart plates being about the same as the thickness of the single plate, so that the single plate is a snug or close fit between the spaced apart plates. Each of the single plate and the pair of spaced apart plates can include openings that can be aligned so that screws (for example security screws) or bolts can be inserted through the openings to connect the respective plates together. In order to adjust the relative angular positions between the platform and the post, one of the single plate and the pair of spaced apart plates can include multiple openings. In some forms of the invention, one of the single plate and the pair of spaced apart plates includes a first pair of openings and the other of the single plate and the pair of spaced apart plates includes two, or three or more pairs of openings, whereby the first pair of openings can be aligned with one of the two, or three or more pairs of openings in order to for the angular position between the platform and the post to be adjusted between two, three or more angular positions.

In some forms of the invention, the pair of spaced apart plates comprise a pair of L-shaped plates, whereby a first section of the L-shapes are in face to face spaced apart relationship to accept the single plate between them and the second, right-angle section of the L-shapes extend away from each other in the same general plane and connect to the post or the platform. Each section of the L-shapes includes openings for the passage of screws so that the first sections can connect to the single plate and the second sections can connect to the post or the platform. In prototype versions of the present invention, the second sections connect to the platform. In these prototype versions of the present invention, the single plate extends from or is upstanding from the post.

In still other forms of the invention, the platform may connect to the post for rotation in a plane that is perpendicular to the axis of the post. That is, if the post is vertical, the platform maybe rotatable through a horizontal plane.

The platform includes a tool connection assembly. The tool connection assembly can be an integral part of the platform, or it can be a separate part that is attached to the platform.

Where the tool connection assembly is an integral part of the platform, the platform is formed for connection to a single suite or family of tools that each incorporate the same form of battery connection. Use of the tool stand for tools that employ a different form of battery connection require the platform to be replaced, or alternatively, a different tool stand can be employed that has the appropriate form of battery connection for the different suite or family of tools. The tool connection assembly can be formed integrally with the platform, by moulding the tool connection assembly and platform as one piece, alternatively, the tool connection assembly and platform can initially be produced as separate parts, but can be non-releasably attached together, such as by glue, or by non-releasable connectors.

Where the tool connection assembly is a separate part that is attached to the platform, the tool connection assembly can be disconnected from the platform and a different form of tool connection assembly can be attached to the platform where there is a change of tools to be displayed that have different battery connections to the former display tools. The platform can be formed as a universal platform that attaches to two or more different tool connection assemblies. In some forms of the invention, the platform can include sets of screw openings suitable for connection to different tool connection assemblies. The tool connection assembly can be attached to the platform in any suitable manner such as by screws, or by snap connection.

The post can be a tubular post, such as a cylindrical post or a square post for example. The length or height of the post can be of any suitable dimension, as can the diameter of the post.

The post can be closed at either end so that at the bottom end, attachment between the post and the base can be by a screw or bolt connection that extends through the base and through the closed bottom end of the post. By this connection, the axial orientation of the post relative to the base can be selected when the post is secured to the base and the orientation can be adjusted by loosening the connection between the post and the base and thereafter by retightening that connection. In some forms of the invention, there may be an interlocking connection made between the bottom end of the post and the base so that the selected orientation is fixed once a secure connection between the post and the base is made. The interlocking connection can include a male and female interconnection so that for example, the bottom end of the post may include one or more projections and the base may include one or more openings for receipt of the one or more projections. With this arrangement, the post can be connected to the base at a suitable orientation and then the secure connection can be made with the interconnection retaining the orientation against inadvertent displacement.

The base of the tool stand can include any suitable connection arrangement for connection to display cabinetry. Display cabinetry can include wall displays or bench displays, or suitable racking. The base may attach to the display cabinetry by screws (for example security screws) or bolts for example, or the base may include an interlocking connection that connects the base to the display cabinetry with or without the use of other connectors. For example, the base can include a quick connection assembly in which one or more male connectors or projections extend from the base for insertion into one or more female openings that are formed as part of the display cabinetry.

The platform connects to the opposite or top end of the post that is remote from the base and as indicated above, the connection can be a fixed connection or a rotatable connection. Where the post is tubular, the top end of the post can be closed and the connection between the platform and the post can be made between the platform and the closed end of the post. The closed end of the post may be closed by a plate that is welded to the top end.

The components of the tool stand can be made of any suitable material and while typically it is expected that some of the components will be metal components and most likely steel components, it is equally possible that one or more of the components can be plastic components. The components of the tool stand do not need to be all of the same material and in particular, it is expected that the tool connection assembly of the platform will be a plastic component that is moulded in the shape of a suitable battery connection of a tool. The base is likely to be fabricated from sheet metal.

BRIEF DESCRIPTION OF THE DRAWINGS

In order that the invention may be more fully understood, some embodiments will now be described with reference to the figures in which.

DESCRIPTION OF PREFERRED EMBODIMENTS

Figure 1:
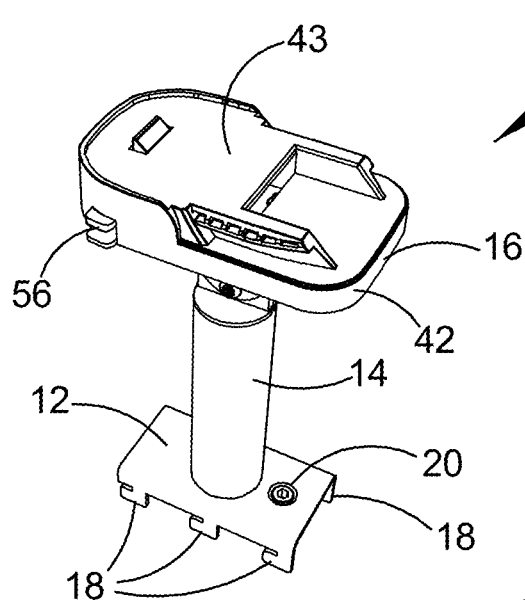
FIG. 1 is a perspective view from above of a tool stand according to a first embodiment of the present invention.

With reference to FIGS. 1 to 4, a tool stand 10 is shown having a base 12, a post 14 and a platform 16.

The base 12 includes a plurality of connection members 18 that are configured for interlocking connection with racking or railing of display cabinetry in a retail outlet. Suitable racking or railing includes openings for receipt of the connection members 18 so that the connection members 18 can be lowered through the openings then shifted relative to the openings so that a section of the racking or railing surrounding the openings enters into the gaps G (see FIGS. 2 and 3) of the members 18 and prevents the base from being lifted away from the racking or railing. Thus, the connection members 18 interconnect with the racking or railing to connect the base 12 to the racking or railing. Once the base 12 is fixed to the racking or railing discussed above, a screw connector 20 can be screwed into a nut 21 that is fixed to the underside of the base 12. The leading end of the screw connector 20 is cone shaped and extends through the nut 21 and into an opening in the racking or railing to prevent disconnection of the connection members 18 from the racking or railing. It is to be noted that the racking or railing can be planar, such as sheet metal, or it can comprise actual parallel rails. Of course, other forms of racking or railing can be provided.

The post 14 is connected to the base 12 by a threaded connector 22 (see FIGS. 2 and 3) that extends through the underside of the base 12 and into a closed end of the post 14. The post 14 is a tubular post and the bottom end that is proximal the base 12 is closed by a plate 23. The plate 23 of the closed end includes a threaded opening into which a connector 22 can threadably connect. In some forms of the invention, the plate 23 includes a nut into which the threaded connector 22 can thread. In the tool stand 10, the nut is on the inside of the plate 23 and so it is not visible in any of the figures. By inserting the threaded connector 22 through the base 12 and into threaded connection with the post 14, the post 14 can be securely connected to the base 12.

Figure 2:
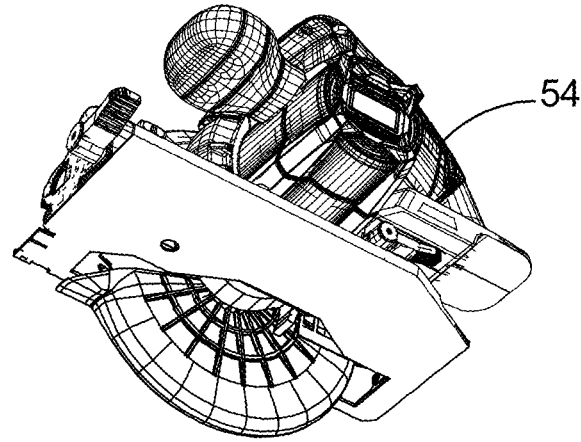
FIG. 2 is a perspective view from below of the tool stand of FIG. 1 and with a tool (a circular saw) shown above the tool stand.
Figure 2:
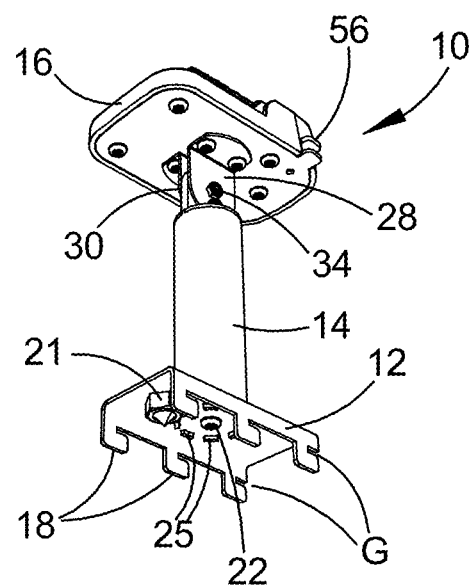
Figure 3:
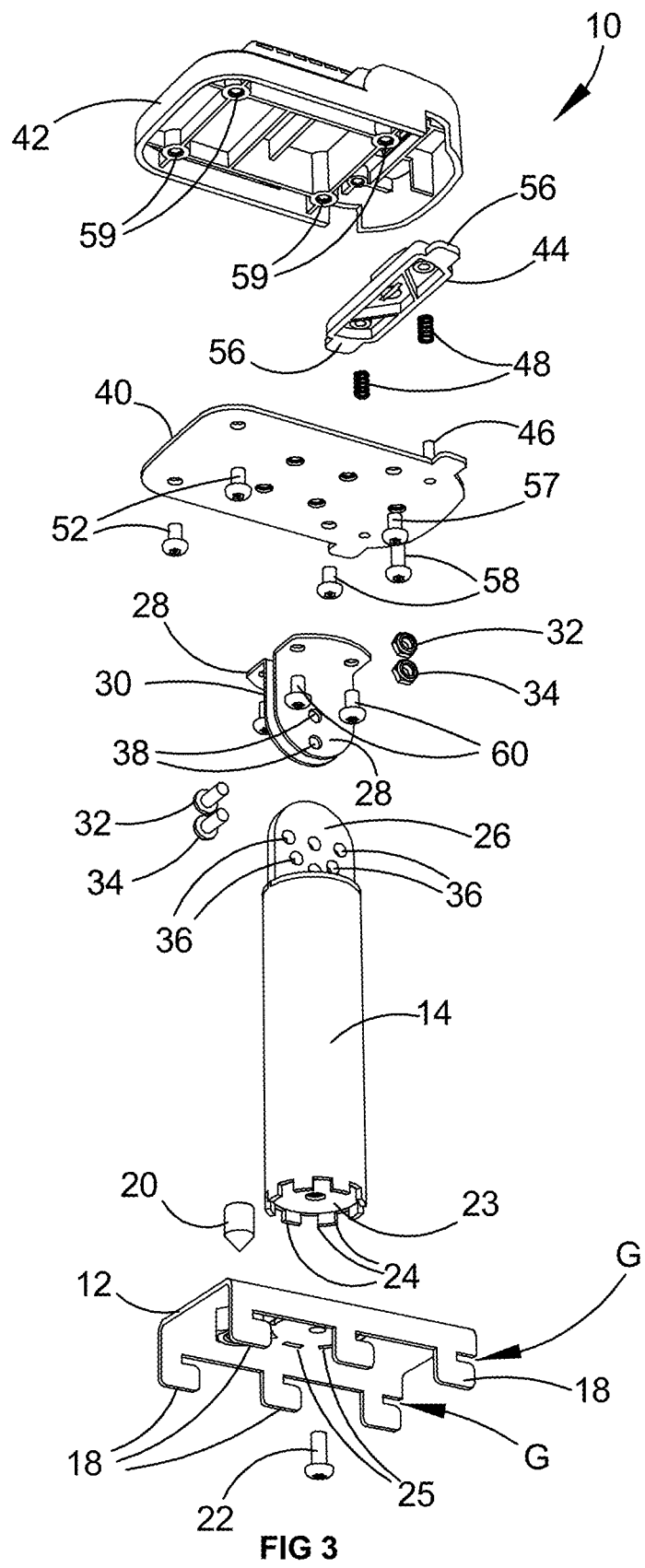
FIG. 3 is an exploded view of the tool stand of FIG. 1 from the same underneath view as FIG. 2.
Figure 4:
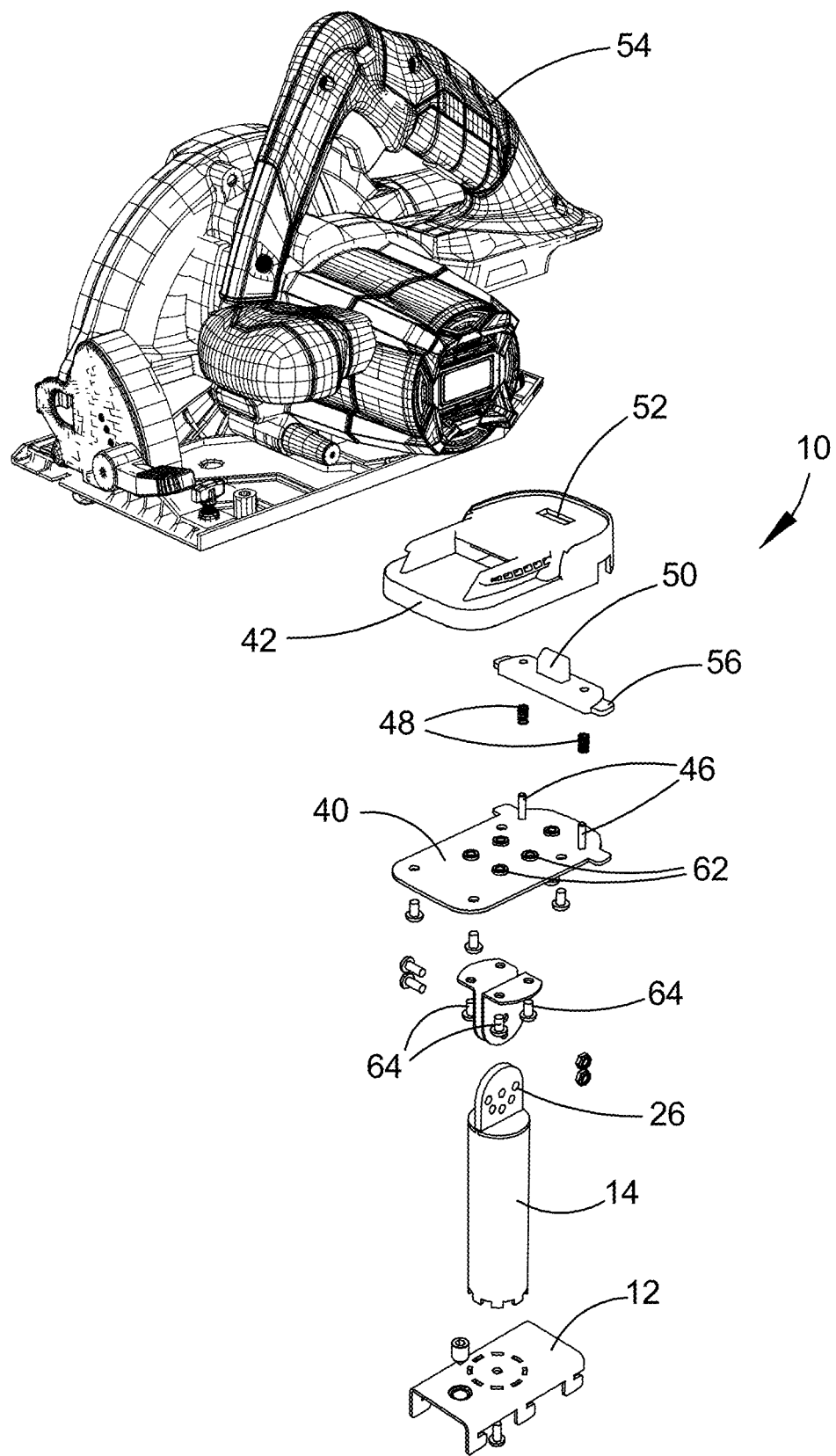
FIG. 4 is an exploded view of the tool stand of FIG. 1 from the same overhead view as FIG. 1.

The post 14 can be connected to the base 12 in any suitable axial orientation. This allows the platform 16 to be rotated relative to the base 12 by rotation of the post 14 relative to the base 12. However, the post 14 can also be connectable to the base 12 in a manner to prevent the selected orientation from being changed unless the threaded connector 22 is loosened or removed. For this, the bottom end of the post 14 can include one or more projections 24 (see FIG. 3) that can be inserted into one or more openings 25 (see FIG. 2) formed in the base 12. As shown in FIGS. 2 and 3, multiple openings 25 provided in a circular pattern for receipt of multiple projections 24 extending from the bottom end of the post 14. The number of projections 24 does not need to match the number of openings 25, but the greater the number of openings 25, the greater the flexibility for selecting the axial alignment or position of the post 14.

Accordingly, to assemble the post 14 to the base 12, the post 14 is aligned relative to the base 12 in the appropriate axial orientation and the projections 24 that extend from the bottom end of the post 14 are inserted into openings 25 of the base 12 and thereafter the threaded connector 22 is inserted through the base 12 and into threaded connection with the post 14.

The opposite or top end of the post 14 includes an upstanding plate connector 26. The plate connector 26 is a flat plate that extends or is upright from the closed top end of the post 14 and which fits between a pair of L-shaped plates 28 that when assembled, form a platform connector 30. The pair of plates 28 are spaced apart to closely accept the plate connector 26 and as shown, a pair of bolts/nuts 32, 34 extend through the plate connector 26 and the pair of plates 28 to connect them together.

The plate connector 26 includes three pairs of holes 36 for separate receipt of the bolts/nuts 32, 34. The L-shaped plates 28 each include one pair of holes 38 which are aligned. The holes 38 can be aligned with one of the three pairs of holes 36 and the bolts/nuts 32, 34 connected so that connection between the plate connector 26 and the pair of plates 28 of the platform connector 30, allows the platform connector 30 to be adjusted between three different angular positions.

It will be evident from the discussion above, that through the two adjustment facilities described, namely 1) adjustment of the axial orientation of the post 14 relative to the base 12, and 2) adjustment of the orientation of the platform connected 30, the platform 16 is adjustable in two planes. This allows for different tools to be positioned differently on the same tool stand.

Platform 16 is shown in exploded view in FIG. 3 and comprises a platform base 40 and a tool connection assembly 42. A releasable connector 44 is interposed between the platform base 40 and the tool connection assembly 42. The releasable connector 44 is mounted on pins 46 and can shift up and down on the pins 46 biased by the springs 48. The releasable connector 44 has a tongue or latch 50 that extends through the opening 52 in the tool connection assembly 42 and into a cooperating opening (not shown) in the circular saw 54 under the influence of the springs 48. This secures the circular saw 54 to the tool connection assembly 42. The releasable connector 44 can be depressed against the bias of the springs 48 by pushing on the wings 56 to release the tongue 50 from the cooperating opening in the circular saw 54 and to allow the circular saw 54 to be disconnected from the tool connection assembly 42 and from the tool stand 10. The releasable connector 44 can be prevented from being depressed by insertion of the security screw 57. The screw 57 screws into a position to prevent the releasable connector 44 from being depressed so that the tongue or latch 50 cannot be released from the cooperating opening of the circular saw 54. This reduces the likelihood of the circular saw 54 being stolen from the tool stand 10.

The platform base 40 and the tool connection assembly 42 are connected together by security screws 58 that screw into threaded openings 59. Likewise, the platform connector 30 is connected to the platform base 40 by security screws 60. The screws 60 screw into nuts 62 that are fixed to the inside surface of the platform base 40.

Figure 5:
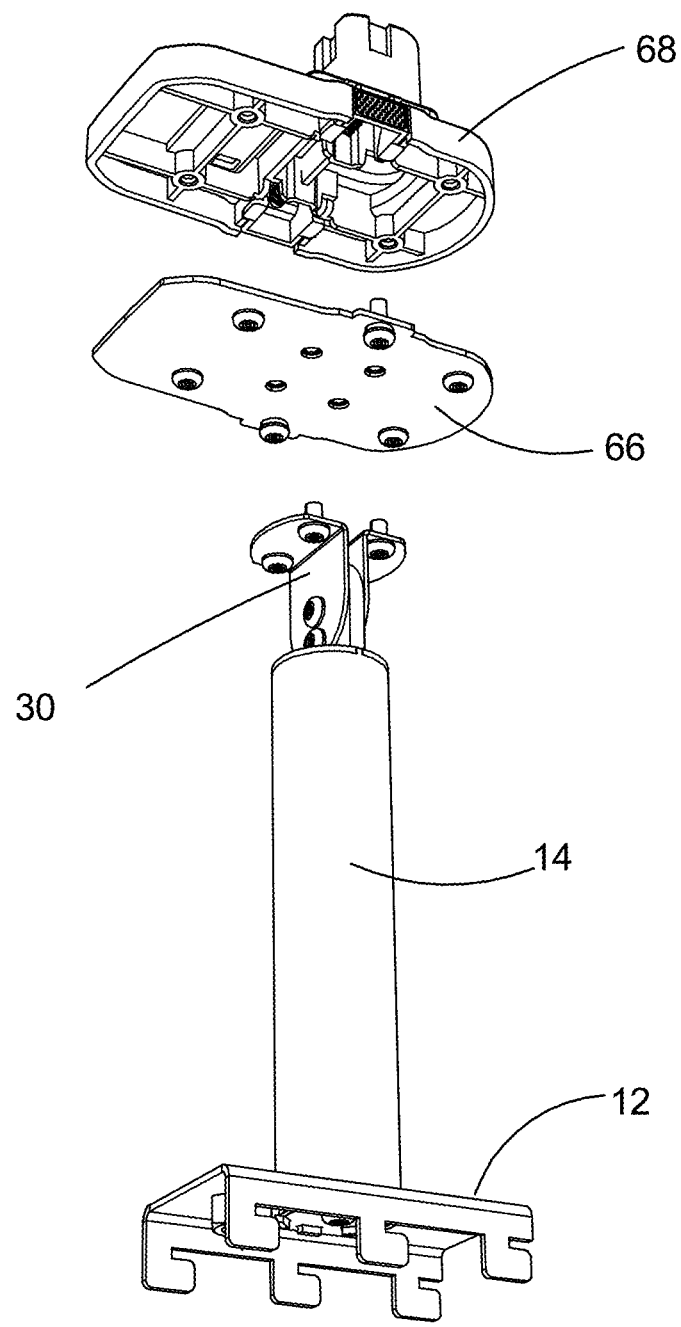
FIG. 5 is a perspective view from below of a different tool stand according to another embodiment of the present invention.

The platform base 40 has a configuration for connection to the platform connector 30 and for connection to the tool connection assembly 42. Differently configured platform bases can allow different tool connection assemblies to be attached to the platform base 40. FIG. 5 shows the same base 12, post 14 and platform connector 30, but with a different platform base 66 and a different tool connection assembly 68 that is suitable for connection to a different manufacturer's tool.

With reference to FIG. 1, the upper surface 43 of the tool connection assembly 42 has a particular configuration for connection of tools that accept a particular form of battery, such as the circular saw 54. Thus, the tool connection assembly 42 is shaped in the form of a battery connection of a battery suitable for connection to a tool to be displayed. The tool connection assembly 42 is only shaped in the form of a battery connection and thus does not have the componentry of a battery connection, for example the conductors that form part of an actual battery connection. The tool connection assembly 42 thus allows a tool that would ordinarily connect to a battery that has the connection configuration of the tool connection assembly 42, to connect to the tool connection assembly 42 and thus to connect to the tool stand 10.

Moreover, it will be evident that for a suite or family of tools that all employ batteries having the same battery connections, that full suite or family of tools can be connected to the same tool stand 10. Thus, while the drawings show one form of tool, being the circular saw 54, any other tool such as a drill or a torch, that connects to the same battery, or to a battery of different capacity but which has the same connection configuration, can be connected to the tool stand 10 and displayed. The flexibility in the orientation of the platform 16 via the two adjustment facilities described above, can allow tools that connect to batteries at different positions to nevertheless be appropriately displayed using the single tool stand 10.

Unless the context requires otherwise, where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

Those skilled in the art will appreciate that the invention described herein is susceptible to variations and modifications other than those specifically described. It is understood that the invention includes all such variations and modifications which fall within the spirit and scope of the present invention.

Future patent applications may be filed in Australia or overseas on the basis of or claiming priority from the present application. It is to be understood that the following claims are provided by way of example only, and are not intended to limit the scope of what may be claimed in any such future application. Features may be added to or omitted from the claims at a later date so as to further define or re-define the invention or inventions.

The invention claimed is:

1. A tool stand for the retail display of battery operated tools, the tool stand comprising:
    a base for connection to display cabinetry,
    a post extending from the base, and
    a platform connected to the post remote from the base, the platform being configured for connection to a tool by including a tool connection assembly that is shaped in the form of a battery connection of a battery suitable for connection to the tool to be displayed,
    the platform being attached to the post rotatably so that it can rotate through a single plane and be fixed in a selected position within the single plane, the platform being attached to the post rotatably by male and female plate connectors extending from each of the platform and the post that are connected together, the male and female plate connectors comprising a pair of spaced apart plates that extend from one of the platform and the post and a single plate that extends from the other of the platform and the post, with the spacing between the spaced apart plates being about the same as the thickness of the single plate, so that the single plate is a snug or close fit between the spaced apart plates, the spaced apart plates comprising a pair of L-shaped plates, whereby a first section of the L-shapes are in face to face spaced apart relationship to accept the single plate between them and the second, right-angle section of the L-shapes extend away from each other in the same general plane and connect to the post or the platform.

2. The tool stand according to claim 1, the tool connection assembly being formed integrally with the platform.

3. The tool stand according to claim 1, the tool connection assembly being formed separate to the platform and being disconnectably attached to the platform.

4. The tool stand according to claim 3, the platform being attachable to two or more different tool connection assemblies.

5. The tool stand according to claim 4, the platform comprising sets of screw openings suitable for connection to different tool connection assemblies.

6. The tool stand according to claim 1, the single plate extends from or is upstanding from the post.

7. The tool stand according to claim 1, each of the single plate and the pair of spaced apart plates comprising openings that can be aligned for accommodating screws, security screws, or bolts to connect the respective plates together.

8. The tool stand according to claim 7, one of the single plate and the pair of spaced apart plates comprises a first pair of openings and the other of the single plate and the pair of spaced apart plates comprises two, or three or more pairs of openings, whereby the first pair of openings can be aligned with one of the two, or three or more pairs of openings in order for the angular position between the platform and the post to be adjusted between two, three or more angular positions.

9. The tool stand according to claim 1, the platform being connected to the post to be able to rotate or pivot relative to the post and to be fixable in a particular orientation so that once the orientation is set the platform remains in that orientation.

10. The tool stand according to claim 1, the platform connecting to the post for rotation in a plane that is perpendicular to the axis of the post.

11. A tool stand for the retail display of battery operated tools, the tool stand comprising:
    a base for connection to display cabinetry,
    a post extending from the base, and
    a platform connected to the post remote from the base, the platform being configured for connection to a tool by including a tool connection assembly that is shaped in the form of a battery connection of a battery suitable for connection to the tool to be displayed,
    the tool being connected to the tool connection assembly by snap connection and the tool connection assembly comprising a screw that interacts with components of the snap connection so that the snap connection cannot be activated to release the tool skin without removing the screw.

12. The tool stand according to claim 11, the tool connection assembly being formed integrally with the platform.

13. The tool stand according to claim 11, the tool connection assembly being formed separate to the platform and being disconnectably attached to the platform.

14. The tool stand according to claim 12, the platform being attachable to two or more different tool connection assemblies.

15. The tool stand according to claim 13, the platform including sets of screw openings suitable for connection to different tool connection assemblies.

16. The tool stand according to claim 11, the platform being connected to the post to be able to rotate or pivot relative to the post and to be fixable in a particular orientation so that once the orientation is set the platform remains in that orientation.

17. The tool stand according to claim 11, the platform connecting to the post for rotation in a plane that is perpendicular to the axis of the post.

* * * * *